United States Patent
Okuyama et al.

(10) Patent No.: US 9,254,725 B2
(45) Date of Patent: Feb. 9, 2016

(54) SUSPENSION DEVICE OF VEHICLE

(71) Applicant: MAZDA MOTOR CORPORATION, Hiroshima (JP)

(72) Inventors: Kazuhiro Okuyama, Hiroshima (JP); Fumitaka Andou, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/454,443

(22) Filed: Aug. 7, 2014

(65) Prior Publication Data

US 2015/0061254 A1 Mar. 5, 2015

(30) Foreign Application Priority Data

Aug. 27, 2013 (JP) .................. 2013-175273

(51) Int. Cl.
  *B60G 3/20* (2006.01)
  *B60G 3/26* (2006.01)
(52) U.S. Cl.
  CPC .. *B60G 3/26* (2013.01); *B60G 3/20* (2013.01); *B60G 2200/156* (2013.01); *B60G 2200/18* (2013.01)
(58) Field of Classification Search
  CPC ......... B60G 3/18; B60G 3/20; B60G 2200/14
  USPC ................................. 280/124.135
  See application file for complete search history.

(56) References Cited

U.S. PATENT DOCUMENTS

| | | | | | |
|---|---|---|---|---|---|
| 4,705,292 | A | * | 11/1987 | Hespelt et al. | 280/124.139 |
| 4,930,804 | A | * | 6/1990 | Tattermusch et al. | 280/124.138 |
| 5,415,427 | A | * | 5/1995 | Sommerer et al. | 280/124.142 |
| 5,507,510 | A | * | 4/1996 | Kami et al. | 280/124.136 |
| 6,431,569 | B2 | * | 8/2002 | Handa | 280/124.138 |
| 2001/0028156 | A1 | * | 10/2001 | Handa | 280/93.512 |
| 2004/0000767 | A1 | * | 1/2004 | Oda et al. | 280/86.751 |
| 2004/0140641 | A1 | * | 7/2004 | Eppelein | 280/124.135 |
| 2005/0275183 | A1 | * | 12/2005 | Amano | 280/124.128 |
| 2008/0179116 | A1 | * | 7/2008 | Ikenoya et al. | 180/63 |
| 2012/0043736 | A1 | * | 2/2012 | Okamoto et al. | 280/124.135 |
| 2013/0249182 | A1 | * | 9/2013 | Moessinger | 280/124.135 |
| 2014/0183834 | A1 | * | 7/2014 | Okuyama et al. | 280/124.109 |

FOREIGN PATENT DOCUMENTS

JP 07-186680 A 7/1995

* cited by examiner

*Primary Examiner* — James English
(74) *Attorney, Agent, or Firm* — Studebaker & Brackett PC (57) ABSTRACT

Suspension arms comprise five arms of a trailing arm, a leading arm, an upper arm, a lower arm, and a control arm. A lower-arm connection portion of a knuckle to the lower arm is positioned in front of a trailing-arm connection portion of the knuckle to the trailing arm as well as a wheel axis. Accordingly, the anti-swing rigidity of a wheel can be increased sufficiently.

8 Claims, 7 Drawing Sheets

Forward

SUSPENSION DEVICE OF VEHICLE

BACKGROUND OF THE INVENTION

The present invention relates to a suspension device of a vehicle.

A suspension device of a vehicle, particularly a suspension device for a rear wheel, is comprised of a so-called multi-link type of suspension which supports a knuckle at a vehicle body via five arms (links) so that the knuckle can swing vertically, for example. Specifically, a suspension device having the following five arms which is disclosed in Japanese Patent Laid-Open Publication No. H7-186680 is known:

(1) a trailing arm extending rearward from a trailing-arm support point on a vehicle-body side and connected to a trailing-arm connection portion of the knuckle which is positioned below a wheel axis of the knuckle;

(2) a leading arm extending forward from a leading-arm support point on the vehicle-body side and connected to a leading-arm connection portion of the knuckle which is positioned above the wheel axis of the knuckle;

(3) an upper arm extending in a vehicle width direction from an upper-arm support point on the vehicle-body side and connected to an upper-arm connection portion of the knuckle which is positioned above the wheel axis of the knuckle;

(4) a lower arm extending in the vehicle width direction from a lower-arm support point on the vehicle-body side and connected to a lower-arm connection portion of the knuckle which is positioned below the wheel axis of the knuckle; and (5) a control arm extending in the vehicle width direction from a control-arm support point on the vehicle-body side, arranged in back of the lower arm, and connected to a control-arm connection portion of the knuckle which is positioned below the wheel axis of the knuckle.

Herein, it is important to configure such that the wheel supported at the knuckle does not improperly move in a swing manner in a plan view at the time of braking or driving of the vehicle (i.e., to increase a so-called anti-swing rigidity of the wheel). In order to increase this anti-swing rigidity, it is preferable that the longitudinal distance between the lower-arm connection portion and the control-arm connection portion of the knuckle in the plan view be configured to be as long as possible.

In the suspension device disclosed in the above-described patent publication, the lower-arm connection portion of the knuckle is positioned substantially on a line of the wheel axis and in back of the trailing-arm connection portion of the knuckle in the plan view, so that the longitudinal distance between the lower-arm connection portion and the control-arm connection portion of the knuckle is considerable short.

SUMMARY OF THE INVENTION

The present invention has been devised in view of the above-described matter, and an object of the present invention is to provide a suspension device of a vehicle which can increase the anti-swing rigidity sufficiently.

According to the present invention, there is provided a suspension device of a vehicle, comprising a knuckle supporting a wheel at a wheel axis, a trailing arm extending rearward from a trailing-arm support point on a vehicle-body side and connected to a trailing-arm connection portion of the knuckle which is positioned below the wheel axis, a leading arm extending forward from a leading-arm support point on the vehicle-body side and connected to a leading-arm connection portion of the knuckle which is positioned above the wheel axis, an upper arm extending in a vehicle width direction from an upper-arm support point on the vehicle-body side and connected to an upper-arm connection portion of the knuckle which is positioned above the wheel axis, a lower arm extending in the vehicle width direction from a lower-arm support point on the vehicle-body side and connected to a lower-arm connection portion of the knuckle which is positioned below the wheel axis, and a control arm extending in the vehicle width direction from a control-arm support point on the vehicle-body side, arranged in back of the lower arm, and connected to a control-arm connection portion of the knuckle which is positioned below the wheel axis, wherein the lower-arm connection portion of the knuckle is positioned in front of the trailing-arm connection portion of the knuckle as well as the wheel axis.

According to the present invention, since the longitudinal distance between the lower-arm connection portion and the control-arm connection portion of the knuckle is properly long, the anti-swing rigidity can be increased sufficiently and the rigidity against a lateral force which is inputted to the wheel when the vehicle turns can be improved as well. Further, since the trailing-arm connection portion of the knuckle is positioned in back of the lower-arm connection portion of the knuckle, any improper interference between the two can be avoided. Herein, the leading arm and the upper arm, which are positioned relatively at an upper level, can cause a so-called tow-in move of the knuckle (wheel) when a braking toque is applied to the wheel or the wheel is accelerated, thereby improving the stability of traveling of the vehicle. Likewise, since the trailing arm, the lower arm, and the control arm, which are positioned relatively at a lower level, cause the tow-in move of the knuckle (wheel) when the braking toque is applied to the wheel, the stability of traveling of the vehicle can be improved further.

According to an embodiment of the present invention, the trailing-arm connection portion of the knuckle is positioned in the vicinity of the wheel axis in a plan view. In this case, since the trailing-arm connection portion of the knuckle is positioned sufficiently rearward, the lower-arm connection portion of the knuckle can be positioned sufficiently forward. Accordingly, the above-described effects of the present invention can be obtained properly.

According to another embodiment of the present invention, the control-arm connection portion of the knuckle is positioned in back of the trailing-arm connection portion, leading-arm connection portion, upper-arm connection portion, and lower-arm connection portion of the knuckle. In this case, the control-arm connection portion of the knuckle is positioned sufficiently forward, so that the above-described effects of the present invention can be obtained more properly.

According to another embodiment of the present invention, a cross point of an extension line of the leading arm and another extension line of the upper arm is positioned on a vehicle-outward side of the wheel axis and in front of the wheel axis in a plan view. In this case, since an upper-end side of the imaginary pivot axis of the knuckle (wheel) is positioned sufficiently forward, the imaginary pivot axis slants forward so that the lateral-force input point of the wheel supported at the knuckle can be positioned in front of a cross point of this imaginary pivot axis crossing the road surface in a side view. Accordingly, the tow-in move of the knuckle (wheel) can be obtained properly when the lateral force is inputted to the lateral-force input point of an outside-located wheel during the vehicle's turning.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 5:
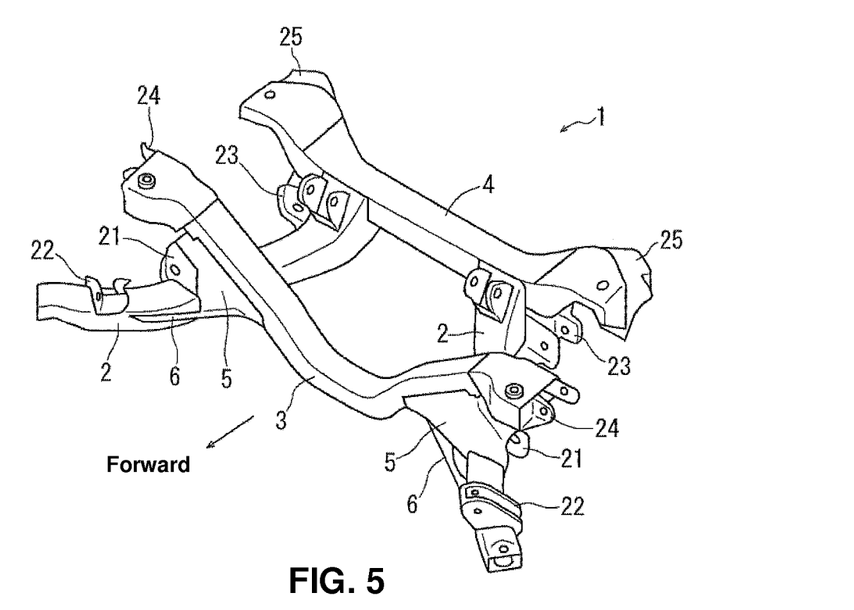
FIG. 5 is a perspective view showing the sub frame used at the suspension device shown in FIG. 1.
Figure 6:
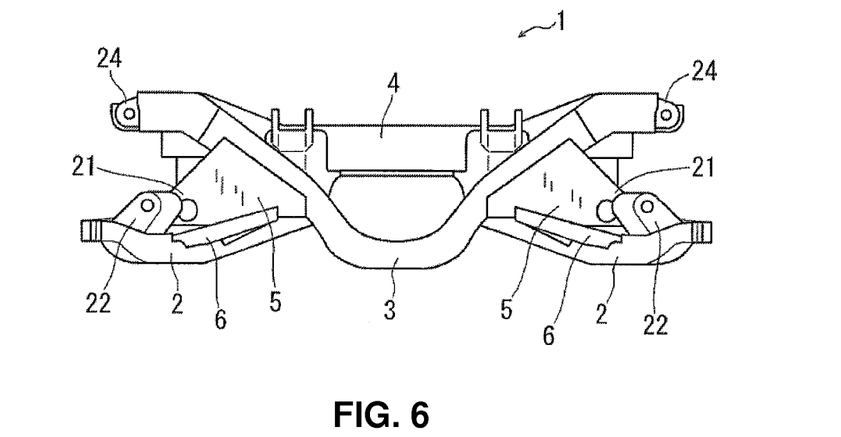
FIG. 6 is an elevational view of the sub frame of FIG. 5, when viewed from the front.
Figure 7:
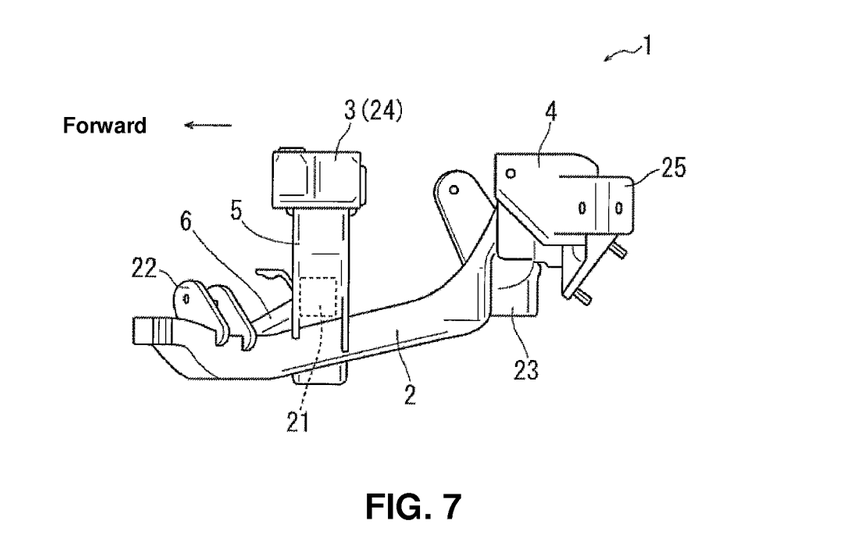
FIG. 7 is a side view of the sub frame of FIG. 5, when viewed from the left.

FIGS. 1-4 show a state in which suspension related components, such as suspension arms, are attached to a sub frame 1 of the present invention. FIGS. 5-7 show the sub frame 1 in a state in which the suspension arms and others are detached from the sub frame 1. In the figures, reference character W denotes a wheel and reference character R denotes road surface.

In FIGS. 1-7, reference character 2 denotes a pair of right-and-left side members, reference character 3 denotes a front cross member, reference character 4 denotes a rear cross member, and reference character 5 denotes brackets. The side member 2, the front cross member 3, and the rear cross member 4 are made from metal (steel-based metal or light metal, such as aluminum alloy, for example) and formed to have a closed cross section, respectively.

The right-and-left side members 2 extend in a longitudinal direction, and the distance between their front end portions is greater than that between their rear end portions. That is, the side members 2 are configured in a curve shape such that their front portions extend gradually outward in a vehicle width direction from their longitudinal-central portions. Further, the side members 2 curve gently such that their middle portions project downward in the side view.

The front cross member 3 interconnects the right-and-left side members 2 substantially at the central portions, in the longitudinal direction, of the side members 2, more specifically, at points that are positioned slightly in front of the central portions of the side members 2. More specifically, the front cross member 3 is formed in a V shape as a whole in the elevational view, when viewed from the front, such that its central portion projects downward and the level of both end portions of the front cross member 3 is higher than that of the side members 2 (see FIGS. 3 and 6, in particular). The both end portions of the front cross member 3 and the central portions, in the longitudinal direction, of the side members 2 are connected via the brackets 5 which extend vertically. Herein, the bracket 5 is made from metal (steel-based metal or light metal, such as aluminum alloy, for example), and preferably formed to have a closed cross section (see FIGS. 8 and 9, in particular).

The rear cross member 4 interconnects the rear end portions of the right-and-left side members 2. Respective end portions of the rear cross member 4 extend slightly outward, in the vehicle width direction, from the rear end portions of the side members 2, which are positioned at the level higher than the rear end portions of the side members 2. The level of the both end portions of the front cross member 3 is substantially equal to the level of the both end portions of the rear cross member 4 (see FIGS. 6 and 7, in particular). Herein, the connecting of the brackets 5 and the rear cross member 4 to the side members 2 and also the connecting of the brackets 5 to the front cross member 3 are conducted by welding or the like, for example. Herein, in the figures, reference character 6 denotes a plate-shaped reinforcing bracket which has a small size and light weight.

As shown in FIGS. 1-4, the sub frame 1 supports a knuckle 16 as a wheel supporting member via five suspension arms LO, TR, CO, UP, LE which will be described later. Further, a lower end portion of a suspension dumper 17 is connected to the knuckle 16.

The sub frame 1 comprises attachment portions of respective inward end portions, in the vehicle width direction, of the above-described five suspension arms LO, TR, CO, UP, LE. That is, a central attachment portion 21 is formed at a lower position of the bracket 5 connecting the side member 2 and the front cross member 3. The lower arm LO is attached to this central attachment portion 21.

Further, a front attachment portion 22 is formed at a front end portion of the side member 2, i.e., at a position which is located in front of the bracket 5, and the adjacent suspension arm TR is attached to this front attachment portion 22. Further, a rear attachment portion 23 is formed at the rear end portion of the side member 2, i.e., at a position which is located in back of the bracket 5, and the control arm CO is attached to this rear attachment portion 23.

A front-upper attachment portion 24 is formed at the end portion of the front cross member 3, and a front-side upper arm UP is attached to this front-upper attachment portion 24. A rear-upper attachment portion 25 is formed at the end portion of the rear cross member 4, and a leading arm LE is attached to this rear-upper attachment portion 25. Respective attachment points of the above-described five arms LO, TR, CO, UP, LE to the sub frame 1 are illustrated with black circular marks in FIG. 4.

Figure 1:
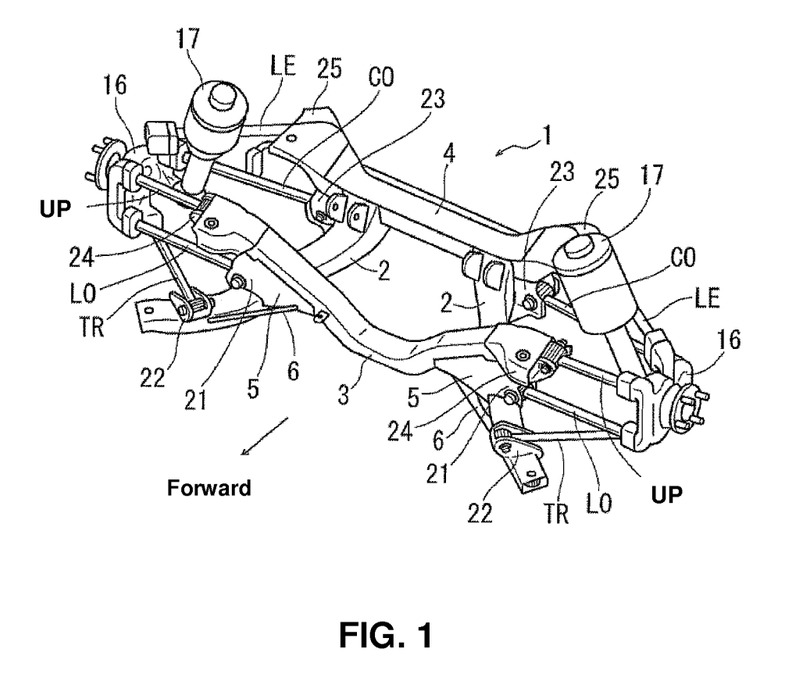
FIG. 1 is a perspective view showing an example of a suspension device of the present invention, together with a sub frame.
Figure 2:
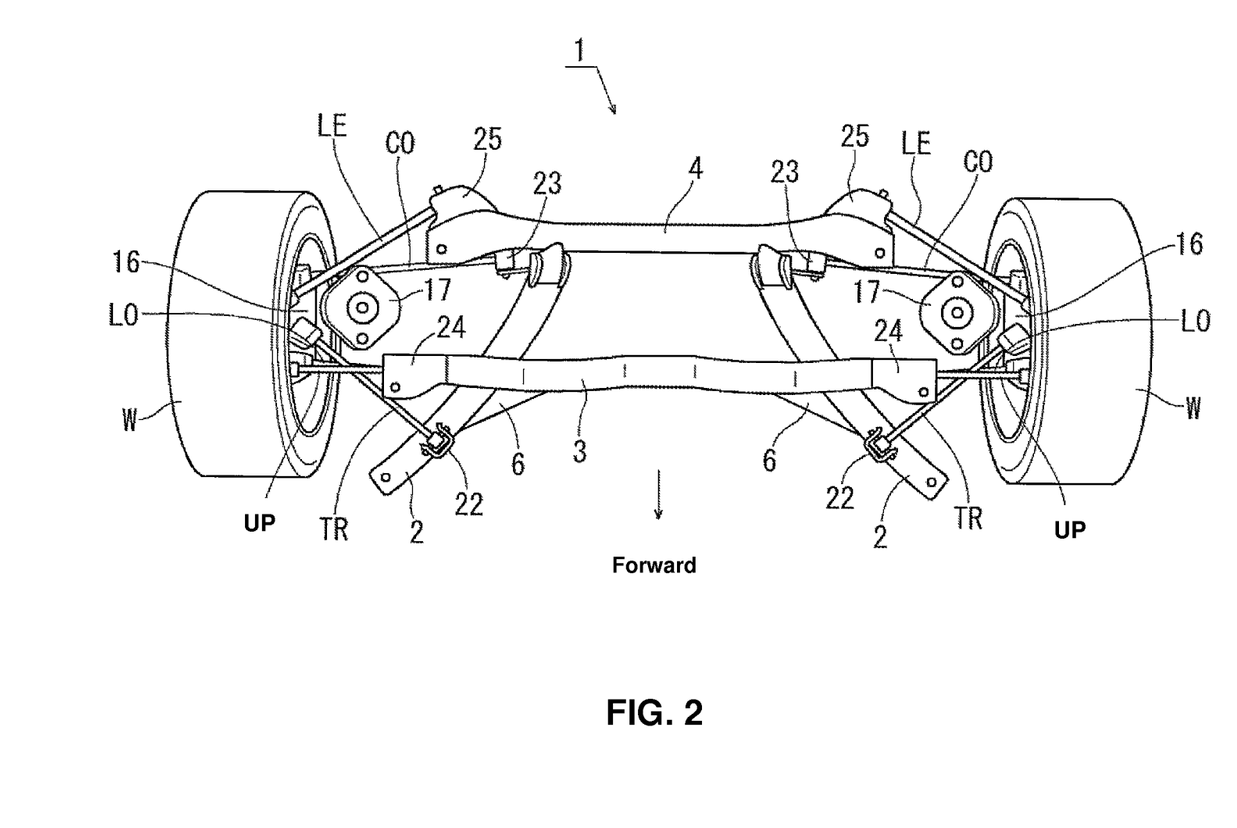
FIG. 2 is a plan view of the suspension device shown in FIG. 1, when viewed from above.
Figure 3:
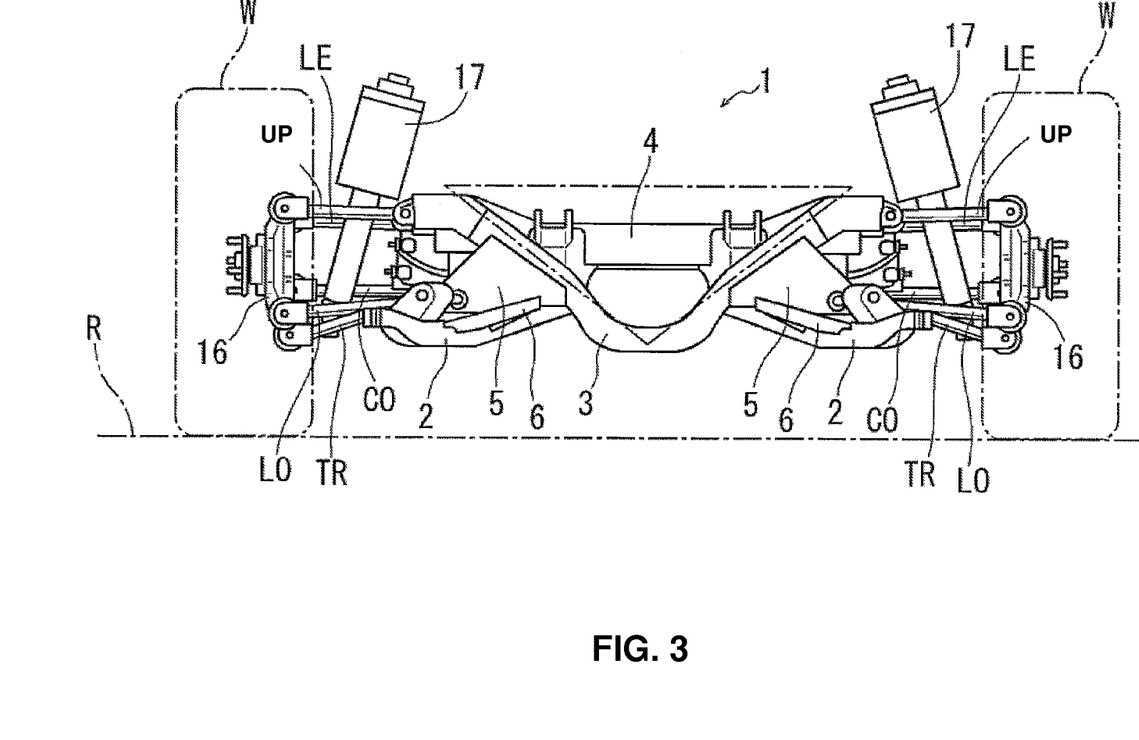
FIG. 3 is an elevational view of the suspension device shown in FIG. 1, when viewed from the front.
Figure 4:
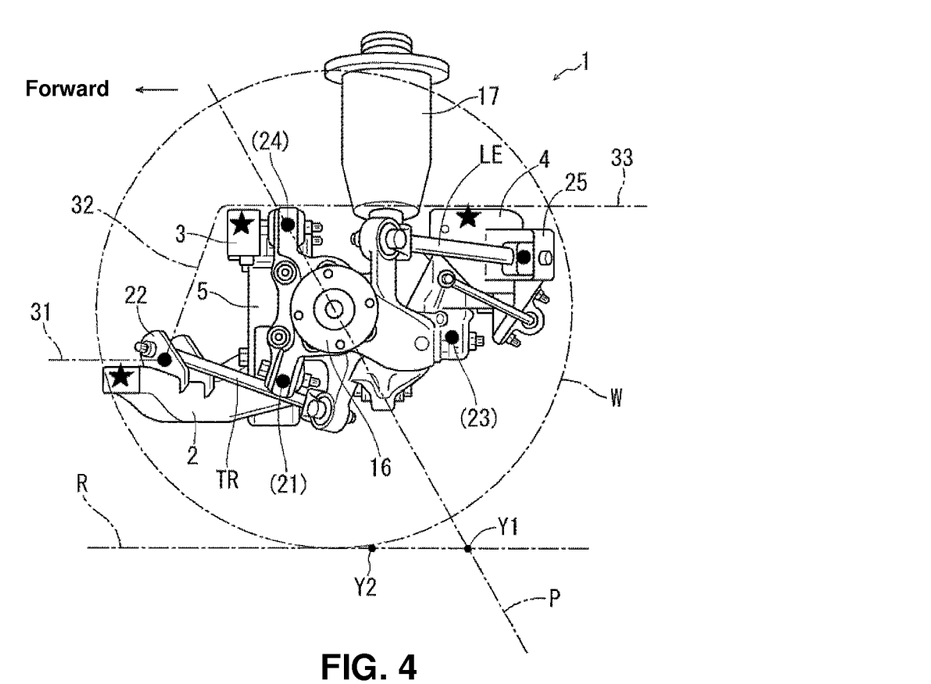
FIG. 4 is a side view of the suspension device shown in FIG. 1, when viewed from the left.

As shown in FIGS. 1-4, the sub frame 1 supports the knuckle 16 as the wheel supporting member via the five suspension arms (suspension links) LO, TR, CO, UP, LE, and is attached to a vehicle-body rear portion from below in a state in which the suspension dumper 17 is connected to the knuckle 16. Attaching of the sub frame 1 to the vehicle body is conducted at six points of the front end portions of the side members 2, the both end portions of the front cross member 3, and the both end portions of the rear cross member 4. The six-point attachments are formed at a rear frame as a reinforcing member of the vehicle body. Respective attachment points of the sub frame 1 to the vehicle body are illustrated with black star marks in FIG. 4. Further, FIG. 4 illustrates a vehicle-compartment floor portion with reference character 31, a rear panel portion with reference character 33, and a kick-up portion extending vertically with reference character 32, by using one-dotted broken lines.

Next, the details of the above-described five suspension arms will be described referring to FIGS. 8 and 9. Herein, the present embodiment is described as the suspension device for a rear-wheel drive vehicle, and a drive shaft is denoted by reference character 50 in FIGS. 8 and 9.

First, the trailing arm TR extends rearward from the vehicle-body side (from the sub frame 1's side) and is connected to a lower portion of the knuckle 16 (i.e., to a specified portion of the knuckle 16 which is positioned below a wheel axis 16a of the knuckle 16). This connection portion is denoted by reference character N-TR. The connection portion N-TR is positioned substantially at the same position as the wheel axis 16a in the longitudinal direction in the plan view.

The leading arm LE extends forward from the vehicle-body side and is connected to an upper portion of the knuckle 16 (i.e., to a specified portion of the knuckle 16 which is positioned above the wheel axis 16a). This connection portion is denoted by reference character N-LE. The connection portion N-LE is positioned in back of the wheel axis 16a in the longitudinal direction in the plan view.

The upper arm UP extends in the vehicle width direction and is connected to an upper portion of the knuckle 16 (i.e., to a specified portion of the knuckle 16 which is positioned above the wheel axis 16a). This connection portion is denoted by reference character N-UP. The connection portion N-UP is positioned in front of the wheel axis 16a in the longitudinal direction in the plan view.

The lower arm LO extends in the vehicle width direction and is connected to a lower portion of the knuckle 16 (i.e., to a specified portion of the knuckle 16 which is positioned below the wheel axis 16a). This connection portion is denoted by reference character N-LO. The connection portion N-LO is positioned in front of the wheel axis 16a in the longitudinal direction in the plan view.

The control arm CO extends in the vehicle width direction in back of the lower arm LO and is connected to a lower portion of the knuckle 16 (i.e., to a specified portion of the knuckle 16 which is positioned below the wheel axis 16a). This connection portion is denoted by reference character N-CO. The connection portion N-CO is positioned in back of the wheel axis 16a in the longitudinal direction in the plan view.

Positional relationships of the respective connection portions are as follows. That is, the connection portion N-UP and the connection portion N-CO are located substantially at the same position which is the foremost position among the above-described connection portions, and the connection portion N-TR is positioned in back of the connection portions N-UP, N-CO. The connection portion N-LE is positioned in back of the connection portion N-TR and the connection portion N-CO is positioned in back of the connection portion N-LE.

Figure 9:
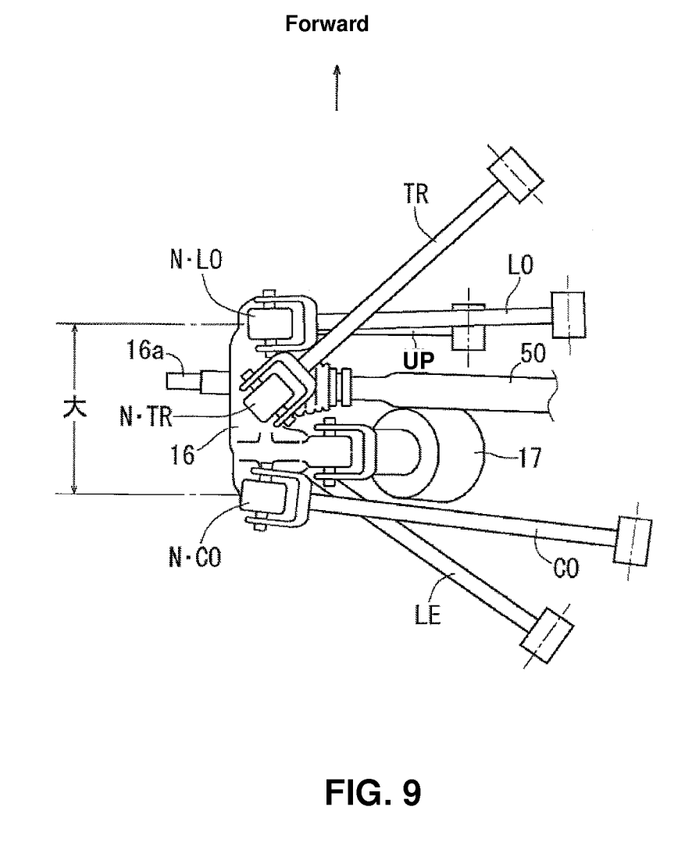
FIG. 9 is a bottom view of FIG. 8.

The connection portions of three lower arms (links) of the trailing arm TR, the lower arm LO, and the control arm CO to the knuckle 16 are arranged such that the connection portion N-LO of the lower arm LO is located at the foremost position and the connection portion N-CO of the control arm CO is located at the rearmost position, so that the longitudinal distance between the connection portions N-LO, N-CO is considerably long in the plan view (see FIG. 9). Accordingly, the anti-swing rigidity can be properly increased. The connection portion N-LO is positioned forward, whereas the connection portion N-TR is positioned in back of the connection portion N-LO so as not to interfere with the connection portion N-LO.

Figure 8:
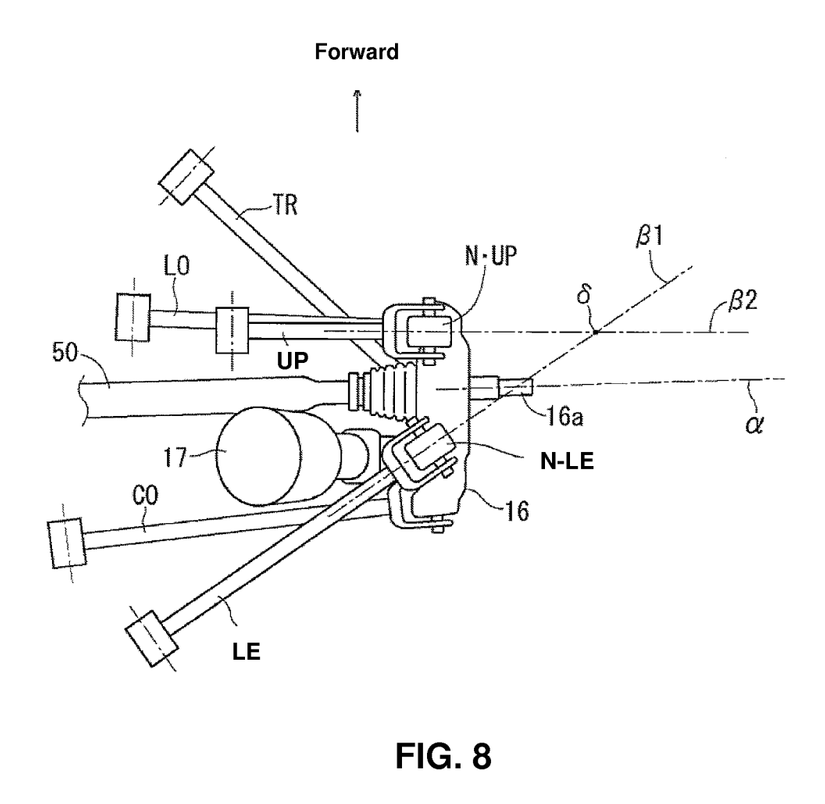
FIG. 8 is a plan view showing an arrangement relationship of a knuckle and five suspension arms.

In FIG. 8, a vehicle-outward extension line of the wheel axis 16a is denoted by reference character α. Further, a vehicle-outward extension line of the leading arm LE which constitutes one of the upper suspension arms is denoted by reference character β1, and a vehicle-outward extension line of the upper arm UP is denoted by reference character β2. In the plan view, a cross point δ of the extension lines β1, β2 constitutes an upper end portion of a momentary imaginary pivot axis. This cross point δ is positioned in front of the wheel axis 16a, so that the imaginary pivot axis of the knuckle 16 slants forward as illustrated. This imaginary pivot axis is denoted by reference character P in FIG. 4. In the side view of FIG. 4, a cross point Y1 of the imaginary pivot axis P which crosses the road surface R is positioned properly in back of the wheel axis 16a. Accordingly, when a lateral force is inputted to the wheel W supported at the knuckle 16 from the road surface (a lateral-force input point Y2 is positioned slightly in back of a contact point of the wheel W with the road surface R) when the vehicle turns, the lateral-force input point Y2 is positioned in front of the cross point Y1 so that the tow-in move of the knuckle 16 (wheel W) can be obtained properly. Additionally, in the present embodiment, the level of the attachment portion 22 of the trailing arm TR to the vehicle-body side is configured to be properly high (an anti-lift angle is large).

Herein, while schematic functions of the five suspension arms will be described, the basic functions are the same as the suspension device disclosed in the above-described patent document. First, in the side view, the so-called Watts-link arrangement is constituted by the trailing arm TR and the leading arm LE, so that the suspension can work (move) properly against an upward-pushing force from the road surface which may occur during the vehicle traveling. Meanwhile, the above-described lateral force is received by the lower arm primarily and the control arm additionally, and the tow control is conducted by the control arm CO. The upper suspension arms comprised of the leading arm LE and the upper arm UP cause a so-called tow-in move of the knuckle 16 (wheel W) when a braking toque is applied to the wheel or the wheel is accelerated, so that the stability of traveling of the vehicle can be improved accordingly. Likewise, the lower suspension arms comprised of the trailing arm TR, the lower arm LO, and the control arm CO cause the tow-in move of the knuckle 16 (wheel W) when the braking toque is applied to the wheel, so that the stability of traveling of the vehicle can be improved accordingly.

The present invention should not be limited to the above-described embodiment, and any other modifications or improvements may be applied within the scope of the claimed invention. The present invention is applicable to a vehicle which does not have the above-described sub frame 1 (in this case, the respective suspension arms may be directly attached to the vehicle body). The present invention is applicable not only to the above-described rear-drive vehicle in which rear wheels are driven only, but also to a four-drive vehicle in which front and rear wheels are driven or a front-drive vehicle in which front wheels are driven only.

What is claimed is:

1. A suspension device of a vehicle, comprising:
a knuckle supporting a wheel at a wheel axis;
a trailing arm extending rearward from a trailing-arm support point on a vehicle-body side and connected to a trailing-arm connection portion of the knuckle which is positioned below the wheel axis;
a leading arm extending forward from a leading-arm support point on the vehicle-body side and connected to a leading-arm connection portion of the knuckle which is positioned above the wheel axis;
an upper arm extending in a vehicle width direction from an upper-arm support point on the vehicle-body side and connected to an upper-arm connection portion of the knuckle which is positioned above the wheel axis;
a lower arm extending in the vehicle width direction from a lower-arm support point on the vehicle-body side and connected to a lower-arm connection portion of the knuckle which is positioned below the wheel axis; and a control arm extending in the vehicle width direction from a control-arm support point on the vehicle-body side, arranged in back of the lower arm, and connected to a control-arm connection portion of the knuckle which is positioned below the wheel axis, wherein said lower-arm connection portion of the knuckle is positioned in front of said trailing-arm connection portion of the knuckle as well as the wheel axis, and said control-arm connection portion of the knuckle is positioned in back of said trailing-arm connection portion, leading-arm connection portion, upper-arm connection portion, and lower-arm connection portion of the knuckle.

2. The suspension device of a vehicle of claim 1, wherein, a cross point of an extension line of said leading arm and another extension line of said upper arm is positioned on a vehicle-outward side of the wheel axis and in front of the wheel axis in a plan view.

3. A suspension device of a vehicle, comprising:

a knuckle supporting a wheel at a wheel axis;

a trailing arm extending rearward from a trailing-arm support point on a vehicle-body side and connected to a trailing-arm connection portion of the knuckle which is positioned below the wheel axis;

a leading arm extending forward from a leading-arm support point on the vehicle-body side and connected to a leading-arm connection portion of the knuckle which is positioned above the wheel axis;

an upper arm extending in a vehicle width direction from an upper-arm support point on the vehicle-body side and connected to an upper-arm connection portion of the knuckle which is positioned above the wheel axis;

a lower arm extending in the vehicle width direction from a lower-arm support point on the vehicle-body side and connected to a lower-arm connection portion of the knuckle which is positioned below the wheel axis; and a control arm extending in the vehicle width direction from a control-arm support point on the vehicle-body side, arranged in back of the lower arm, and connected to a control-arm connection portion of the knuckle which is positioned below the wheel axis, wherein said lower-arm connection portion of the knuckle is positioned in front of said trailing-arm connection portion of the knuckle as well as the wheel axis, said trailing-arm connection portion of the knuckle is positioned in the vicinity of the wheel axis in a plan view, and said control-arm connection portion of the knuckle is positioned in back of said trailing-arm connection portion, leading-arm connection portion, upper-arm connection portion, and lower-arm connection portion of the knuckle.

4. The suspension device of a vehicle of claim 3, wherein, a cross point of an extension line of said leading arm and another extension line of said upper arm is positioned on a vehicle-outward side of the wheel axis and in front of the wheel axis in a plan view.

5. A suspension device of a vehicle, comprising:

a knuckle supporting a wheel at a wheel axis;

a trailing arm extending rearward from a trailing-arm support point on a vehicle-body side and connected to a trailing-arm connection portion of the knuckle which is positioned below the wheel axis;

a leading arm extending forward from a leading-arm support point on the vehicle-body side and connected to a leading-arm connection portion of the knuckle which is positioned above the wheel axis;

an upper arm extending in a vehicle width direction from an upper-arm support point on the vehicle-body side and connected to an upper-arm connection portion of the knuckle which is positioned above the wheel axis;

a lower arm extending in the vehicle width direction from a lower-arm support point on the vehicle-body side and connected to a lower-arm connection portion of the knuckle which is positioned below the wheel axis; and a control arm extending in the vehicle width direction from a control-arm support point on the vehicle-body side, arranged in back of the lower arm, and connected to a control-arm connection portion of the knuckle which is positioned below the wheel axis, wherein said lower-arm connection portion of the knuckle is positioned in front of said trailing-arm connection portion of the knuckle as well as the wheel axis, and a cross point of an extension line of said leading arm and another extension line of said upper arm is positioned on a vehicle-outward side of the wheel axis and in front of the wheel axis in a plan view.

6. The suspension device of a vehicle of claim 1, wherein said trailing-arm connection portion of the knuckle is positioned in the vicinity of the wheel axis in a plan view.

7. The suspension device of a vehicle of claim 5, wherein said control-arm connection portion of the knuckle is positioned in back of said trailing-arm connection portion, leading-arm connection portion, upper-arm connection portion, and lower-arm connection portion of the knuckle.

8. The suspension device of a vehicle of claim 5, wherein said trailing-arm connection portion of the knuckle is positioned in the vicinity of the wheel axis in a plan view.

* * * * *